United States Patent [19]

Hahn

[11] Patent Number: 5,212,846
[45] Date of Patent: May 25, 1993

[54] VEHICLE RESTRAINT

[75] Inventor: Norbert Hahn, South Milwaukee, Wis.

[73] Assignee: Rite-Hite Corporation, Milwaukee, Wis.

[21] Appl. No.: 738,928

[22] Filed: Aug. 1, 1991

[51] Int. Cl.$^5$ .................... B65B 21/02; E01D 1/00
[52] U.S. Cl. ........................ 14/69.5; 14/71.1; 14/71.5; 414/401
[58] Field of Search ............. 414/401, 396, 584; 14/71.1, 71.5, 69.5

[56] References Cited

U.S. PATENT DOCUMENTS

| | | | |
|---|---|---|---|
| 4,553,895 | 11/1985 | Ellis | 414/401 |
| 4,605,353 | 8/1986 | Hahn et al. | 414/401 |
| 4,630,989 | 12/1986 | Davey | 414/401 |
| 4,664,582 | 5/1987 | Edmeads | 14/71.1 X |
| 4,767,254 | 8/1988 | Kovach et al. | 14/71.1 X |
| 4,784,567 | 11/1988 | Hageman et al. | 414/401 |
| 4,915,568 | 4/1990 | West | 414/401 |
| 5,054,237 | 10/1991 | Kapala | 404/6 |

Primary Examiner—Terry Lee Melius
Assistant Examiner—Nancy P. Connolly
Attorney, Agent, or Firm—Leydig, Voit & Mayer

[57] ABSTRACT

A vehicle restraint is provided for securing a parked vehicle against a loading dock while the vehicle is being loaded or unloaded. The restraint includes a housing for below-ground installation and in which a ram is stored. The ram is mounted in the housing for vertical movement through an opening in the top of the housing, allowing the ram to move between a stored position and a raised position. Doors are provided for closing the opening in the top of the housing when the ram is in the stored position. A hydraulic cylinder is provided for moving the ram. A hook assembly is attached to the top of the ram for releasably retaining the vehicle. The hook assembly includes a hook in a stepped configuration to enable engagement of ICC bars having various heights and positioned various distances away from the loading dock wall. A sensor is provided for detecting when the hook engages the ICC bar of the vehicle and to stop the vertical movement of the ram when such engagement has been made. The hook assembly is pivotable about a vertical axis to permit controlled angular adaptation to the ICC bar when the vehicle is not parked at right angles to the loading dock wall. An automatic release mechanism is provided to protect the cylinder.

16 Claims, 7 Drawing Sheets

VEHICLE RESTRAINT

BACKGROUND OF THE INVENTION

In order to reduce the risk of serious bodily injury and damage to cargo and equipment during the loading and unloading of a parked vehicle, it is important that the vehicle be securely held in place at or near the edge of the loading dock. Releasable locking devices for restraining vehicles have been disclosed previously, but the prior art devices have not been capable of below-ground storage. They generally have been mounted either on the roadway or on the loading dock wall, where they can be obstacles even when in a stored position.

Thus, the prior art locking devices are subject to being struck by the parking vehicle, particularly if the vehicle has a low clearance. When used in conjunction with certain dock levelers capable of extending down to the ground level, the prior art devices also can present an obstacle to the movement of certain equipment, e.g., the dock leveler and fork lift trucks.

The prior art devices also typically are limited to a specified range of height for the ICC bar of a vehicle for an effective restraint to occur. Other problems with the prior art locking devices include the inability to provide a secure restraint over an acceptable range of horizontal distance between the ICC bar and the loading dock wall. A further disadvantage of the prior art is an inability of the hook to provide angular adaptation to fully engage the ICC bar if the vehicle is not parked at right angles to the loading dock.

SUMMARY OF THE INVENTION

Thus, it is an object of the invention to provide a vehicle restraint of the type described which avoids the aforenoted shortcomings.

It is a further object of the invention to provide a vehicle restraint using a ram which can be stored below ground.

A still further object of the invention is to provide a vehicle restraint which, when stored below ground, leaves a top surface which is flush with the ground to permit equipment such as a fork lift truck to move above the restraint without obstruction while at the same time preventing any part of the equipment from falling below the ground level.

A still further object of the invention is to provide doors for closing above the vehicle restraint when in a stored position, which doors protect the vehicle restraint while at the same time providing a surface flush with the ground.

A still further object of the invention is to provide a stepped hook with a stepped sensor to provide various vertical heights at which the hook will engage the ICC bar of a vehicle and also to provide various steps spaced horizontally to engage the ICC bar and to prevent the vehicle from gaining a "running start" in which the vehicle gains speed while moving away from the loading dock.

A still further object of the invention is to provide a vehicle restraint which provides for angular adaptation of the hook to permit the hook to fully engage the ICC bar even if the vehicle is not parked at right angles to the loading dock.

Further and additional objects will appear from the description, accompanying drawings, and appended claims.

In accordance with one embodiment of the invention, a device is provided for releasably retaining a parked vehicle against a loading dock or the like while the vehicle is being loaded or unloaded. The device includes a housing for below-ground installation and in which a ram is stored. The ram is mounted in the housing for substantially vertical movement through an opening in the top of the housing, allowing the ram to move between a first stored position and a second raised position. A power means is provided for moving the ram in the substantially vertical direction as described. A hook means is attached to the top of the ram for releasably retaining a vehicle. The hook means includes a hook in a stepped configuration to enable engagement of ICC bars having various heights and positioned various distances away from the loading dock wall. Door means are provided for closing the opening in the top of the housing when the ram is in the stored position. A sensor is provided for detecting when the hook means engages the ICC bar of the vehicle and to stop the vertical movement of the ram when such engagement has been made.

BRIEF DESCRIPTION OF THE DRAWINGS

For a more complete understanding of the invention, reference should be made to the drawings wherein.

DESCRIPTION OF THE PREFERRED EMBODIMENT

Figure 1A:
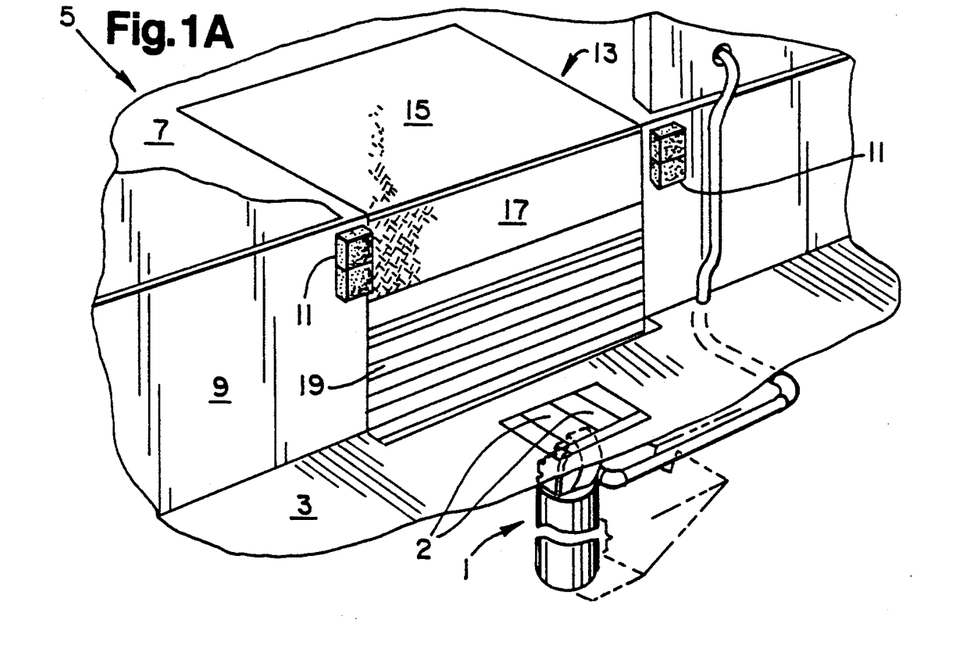
FIG. 1a is a fragmentary perspective view of the improved vehicle restraint in a below-ground stored position near the front wall of a loading dock.

Referring now to the drawings and more particularly to FIG. 1a, the improved vehicle restraint 1 is shown in a stored position under a pair of doors 2. FIG. 1a also illustrates an example of a loading dock 5 with which the invention might be used.

The loading dock 5 shown in FIG. 1a typically includes a concrete dock floor 7 and a vertical wall 9 on which a pair of rubber bumpers 11 are mounted. The loading dock 5 may advantageously be provided with a dock leveler 13 including a steel plate 15 which is normally stored in a position flush with the loading dock floor 7. The dock leveler 13 also has a steel lip 17 which can be pivotally extended away from the dock wall 9 to provide an extension from the loading dock to the vehicle.

The dock leveler 13 may be of the type having a scissor lift, see U.S. Pat. No. 4,995,130, issued to Hahn et al. Plastic bellows 19 may be provided to cover the scissor lift mechanism. The dock leveler 13 shown in FIG. 1a preferably is capable of being moved downwardly until the steel plate 15 is flush with roadway 3. See FIG. 1c. The vehicle restraint 1 of this invention is particularly advantageous when used in conjunction with such a dock leveler, because a fork lift truck 20 may be lowered on steel plate 15 to the ground level, where it may be driven away from the loading dock 5 without obstruction when the vehicle restraint is in a stored position with the doors 2 closed. See FIG. 1c.

Figure 1B:
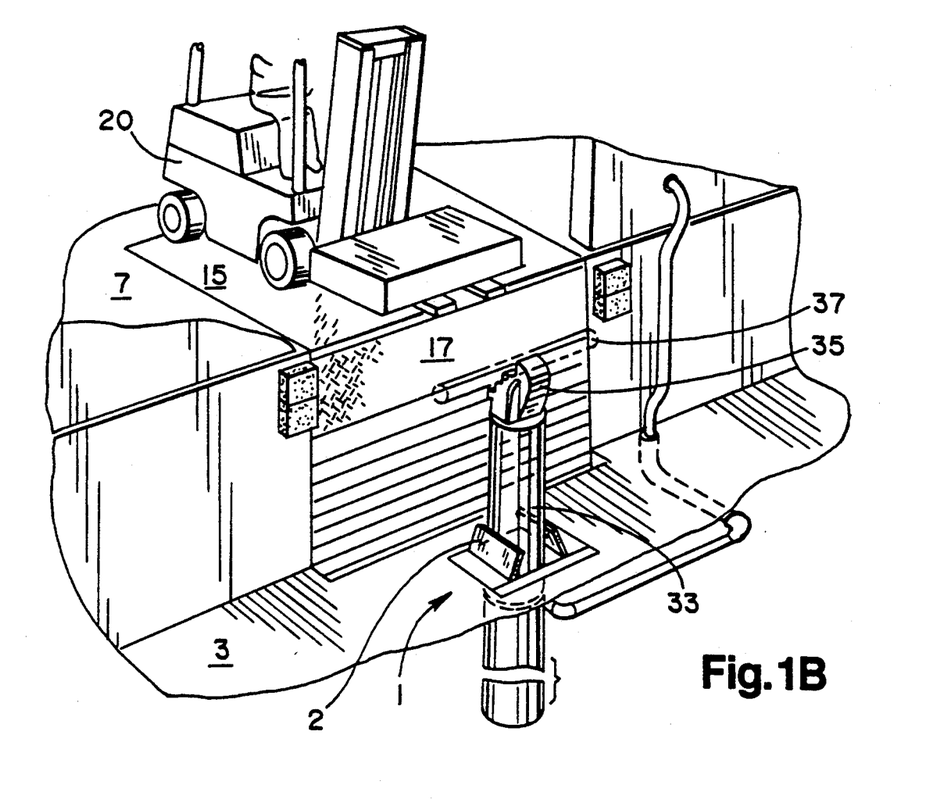
FIG. 1b is similar to FIG. 1a, except that the vehicle restraint is in a raised position above the ground.

Referring now to FIG. 1b, the vehicle restraint 1 is shown in an operative mode wherein the ram 33 is in a raised position with the hook assembly 35 engaging the ICC bar 37 of a vehicle thereby restraining the vehicle from movement. In the embodiment shown, the ram 33 is in the form of an intermediate tube and may sometimes be referred to hereinafter as such.

Figure 1C:
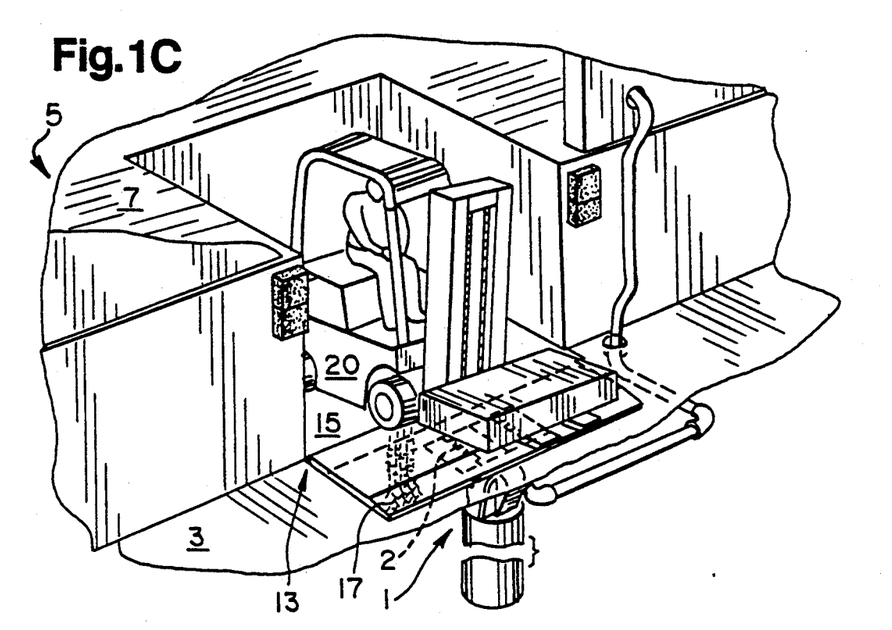
FIG. 1c is similar to FIG. 1a, except that the dock leveler is shown in the down position.

FIG. 1c is similar to FIG. 1a in that the vehicle restraint is shown in the stored position but the dock leveler 13 is shown in the down position with the steel plate 15 flush with the ground and the steel lip 17 pivoted outwardly from the loading dock in a position overlying and parallel to the ground. Thus, one of the advantages of the invention can be seen, namely, that the stored vehicle restraint 1 does not form an obstruction between the loading dock 5 and the roadway 3. For example, a fork lift truck may be lowered from the loading dock floor 7 on the steel plate 15 until it is at the ground level as shown in FIG. 1c and thence driven away from the loading dock 5 without being obstructed by the improved vehicle restraint 1 of the invention. This is a significant advantage over the prior art vehicle restraints which constitute obstacles above ground even when in the stored position.

Figure 2:
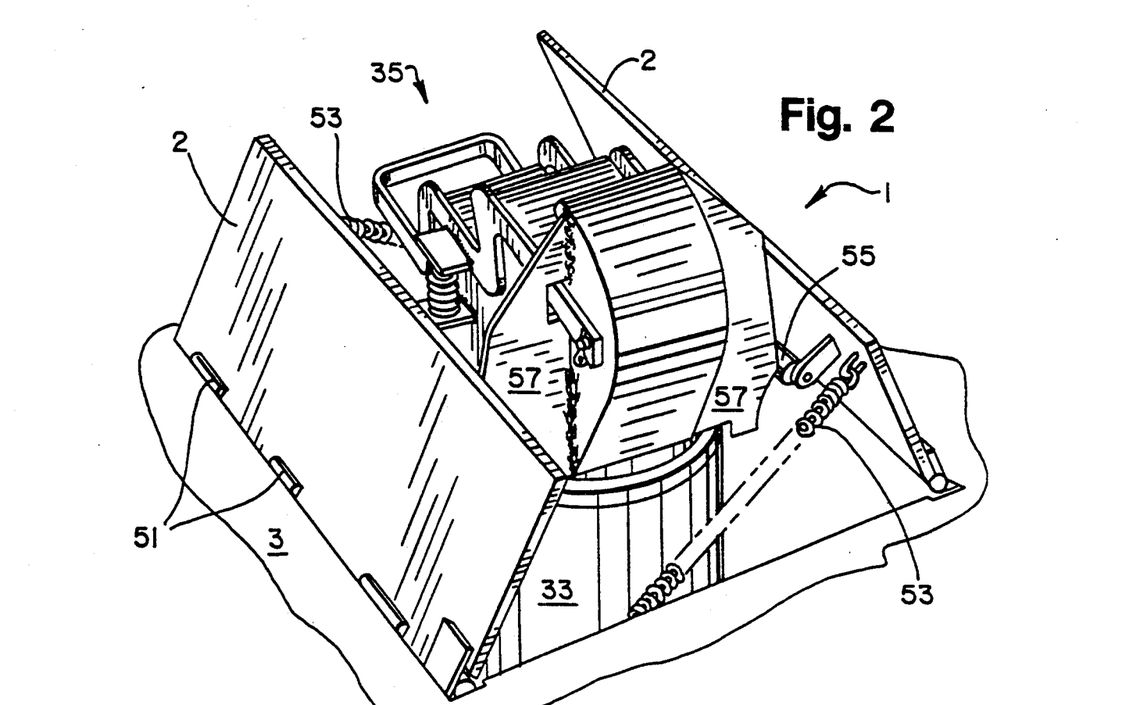
FIG. 2 is a fragmentary perspective view of the vehicle restraint emerging from the stored position.

Turning now to FIG. 2, the vehicle restraint 1 is shown emerging from the ground and above roadway 3. It will be understood that FIG. 2 also represents the vehicle restraint when being retracted from the raised position shown in FIG. 1b to the stored position shown in FIG. 1a. In FIG. 2, the doors 2 are shown with hinges 51 and springs 53. A roller 55 is attached to each door 2. The hook assembly 35 is provided with cams 57 which engage the rollers 55. It will understood that as the hook assembly 35 is raised by the ram 33, the cams 57 will engage the rollers 55 and thereby open the doors 2. Upon retracting the hook assembly 35, the springs 53 will close the doors 2 as the receding cams 57 permit the rollers 55 to follow the cams into the ground.

It will be understood that while a pair of hinged doors 2 are shown in FIG. 2, the vehicle restraint 1 would be operable even if no such doors are provided. The function of doors 2 is to protect the other parts of the vehicle restraint 1 when in the stored position, e.g., by preventing debris from falling below the doors. It will be understood that a single door (either hinged or sliding), a pair of sliding doors, a door mounted on the hook assembly 35, or other equivalent structure could be substituted for the pair of hinged doors 2.

Figure 3:
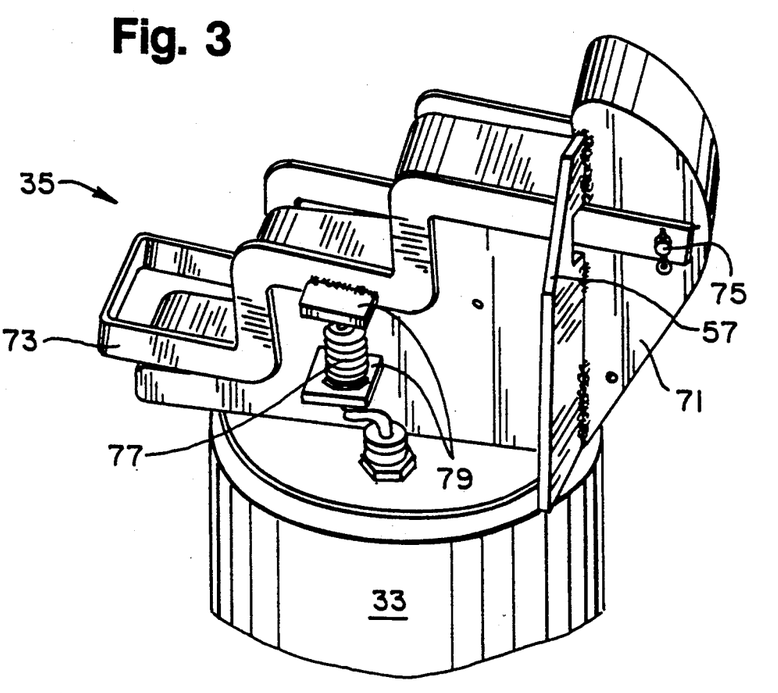
FIG. 3 is a fragmentary perspective view of the vehicle restraint showing the hook assembly with a sensor in an extended position.

Turning now to FIG. 3, the hook assembly 35 is shown in a raised position prior to the engagement of the ICC bar (not shown). The hook assembly 35 includes a hook weldment 71 and a sensor 73 which is pivotally connected to the hook weldment by a pin 75. The purpose of the sensor 73 is to detect the presence of an ICC bar 37 by engaging the ICC bar which depresses the sensor 73 relative to the hook weldment 71. See FIG. 4. Means for detecting the presence of an ICC bar 37 are provided in this embodiment by a spring and switch assembly 77 mounted between brackets 79. The hook assembly 35 is connected to the ram 33 by bolts 81. See FIGS. 5–7.

Figure 4:
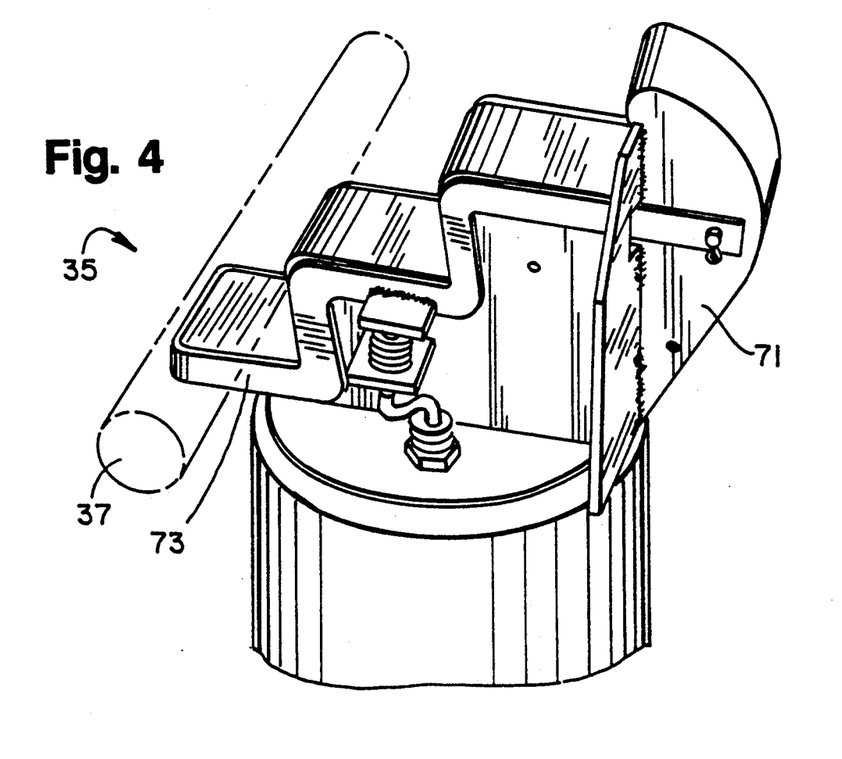
FIG. 4 is similar to FIG. 3 except that the sensor is shown in a depressed position.

The hook assembly 35 shown in FIGS. 3 and 4 includes a stepped hook 71 and stepped sensor 73. See also FIGS. 10–12. Both the hook and the sensor have three steps, which allow for engaging an ICC bar 37 at various heights and also at various horizontal distances away from the leading dock wall. The step configuration avoids the possibility of horizontal play between the ICC bar and the hook, thus preventing the vehicle from getting a "running start" if for any reason the vehicle attempts to pull away from the dock wall. This feature of the invention helps to prevent personal injury and damage to equipment and cargo.

Figure 5:
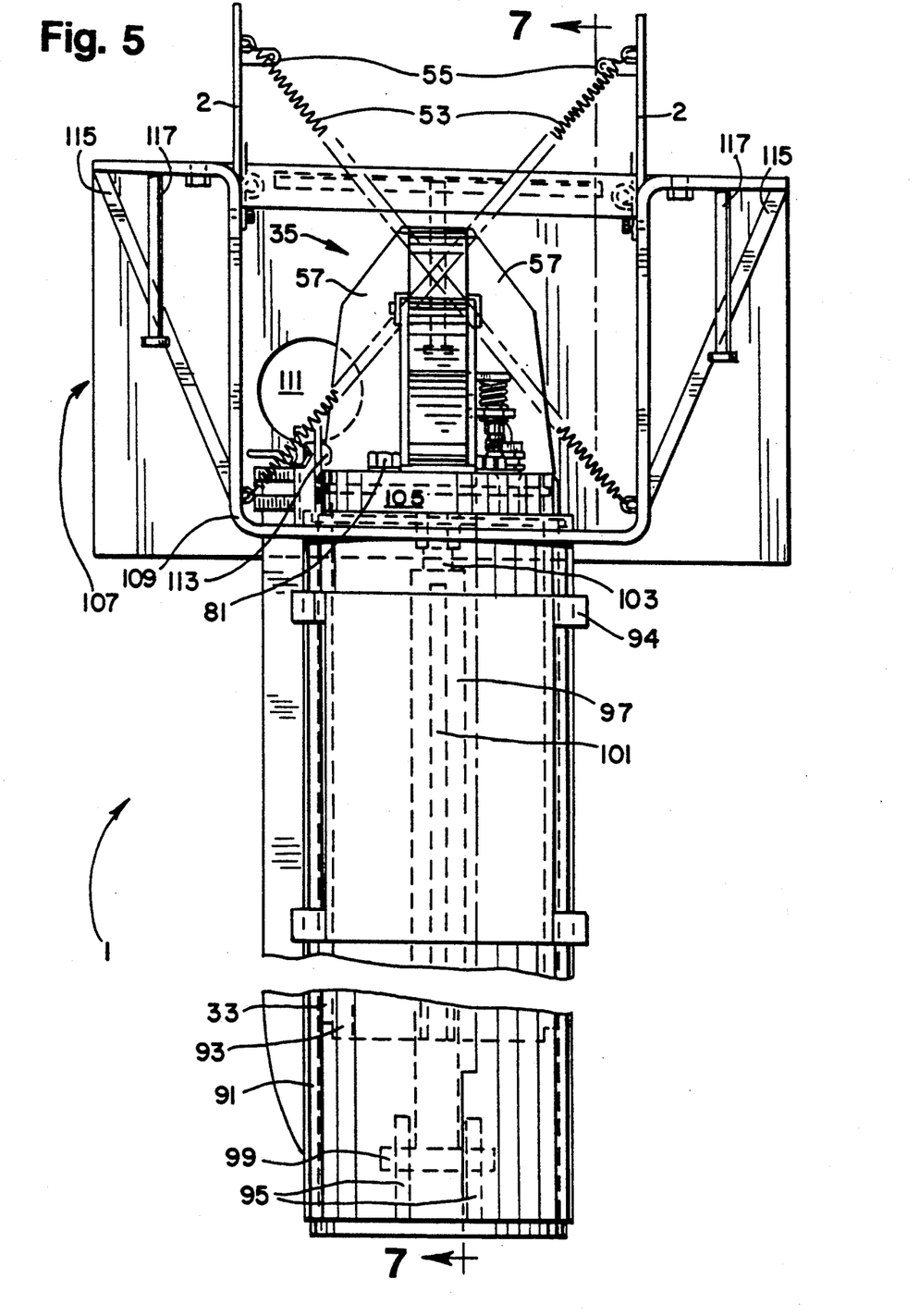
FIG. 5 is a rear elevational view of the vehicle restraint in a stored position (doors shown open for clarity).

Turning now to FIG. 5, a rear elevational view of the vehicle restraint 1 is shown. In this embodiment, the ram or intermediate tube 33 is housed in a base tube 91. The intermediate tube 33 is preferably reinforced by a stiffener tube 93 in the lower portion of the intermediate tube to allow for reinforcement when the intermediate tube is extended a substantial distance above the base tube. The base tube 91 is also reinforced by a reinforcing plate 94, again to provide reinforcement when the intermediate tube 33 is extended a substantial distance above the base tube 91 at which point the bottom of the intermediate tube 33 can exert a substantial force against the base tube 91 in the region of the reinforcing plate 94 when the hook assembly 35 engages the ICC bar of a vehicle.

At the bottom of the base tube 91 shown in FIG. 5 there is shown a clevis 95 to which a hydraulic cylinder housing 97 is attached by a cross pin 99. The cylinder housing 97 is provided with a rib 101 to prevent the intermediate tube 33 from rotating beyond a limit determined by guides 151 welded to the inside of the intermediate tube. See FIGS. 8 and 9.

Returning to FIG. 5, a cylinder rod 103 extends above the cylinder housing 97 and connects to a cap 105 at the top of intermediate tube 33. Hook assembly 35 is mounted on cap 105, so that the extension of cylinder rod 103 results in raising cap 105, the intermediate tube 33, and the hook assembly 35. (Alternately, the ram or intermediate tube 33 can be raised manually, by air-powered cylinder, or electromechanically.) Attached to the top of the base tube 91 is a hook box 107 within which the hook assembly 35 is stored. The hook box 107 includes a box weldment 109. The box weldment 109 is provided with an opening 111 through which a field conduit can be routed to communicate hydraulic hoses, and electrical cable, etc., between the vehicle restraint and a control station on the loading dock within the building. The hook box 107 also contains a storage switch 113 to detect when the hook assembly 35 is in the stored position and to communicate the same to the control station by means of cable 114 The control station (not shown) may include power means such as a hydraulic system with a hydraulic pump and hydraulic fluid tank, "up" and "down" controls, position switch signal receivers, and audible and visual instruction signals such as red and green lights and a horn. The hook box 107 also is provided with diagonal straps 115 for reinforced structural strength and anchors 117 to anchor the hook box in the concrete.

It will be understood that while the embodiment shown in FIG. 5 provides a housing for the vehicle restraint 1 in the form of a base tube 91 and a hook box 107, other forms for a housing for restraint 1 could alternatively be provided. It will also be understood that the housing for the vehicle restraint 1 can be installed in the ground using poured concrete as known in the art. Similarly, the vehicle restraint will be leveled prior to the concrete installation, and the vehicle restraint will be provided with additional concrete anchors (not shown), but which can be provided in a variety of forms known in the art.

Figure 6:
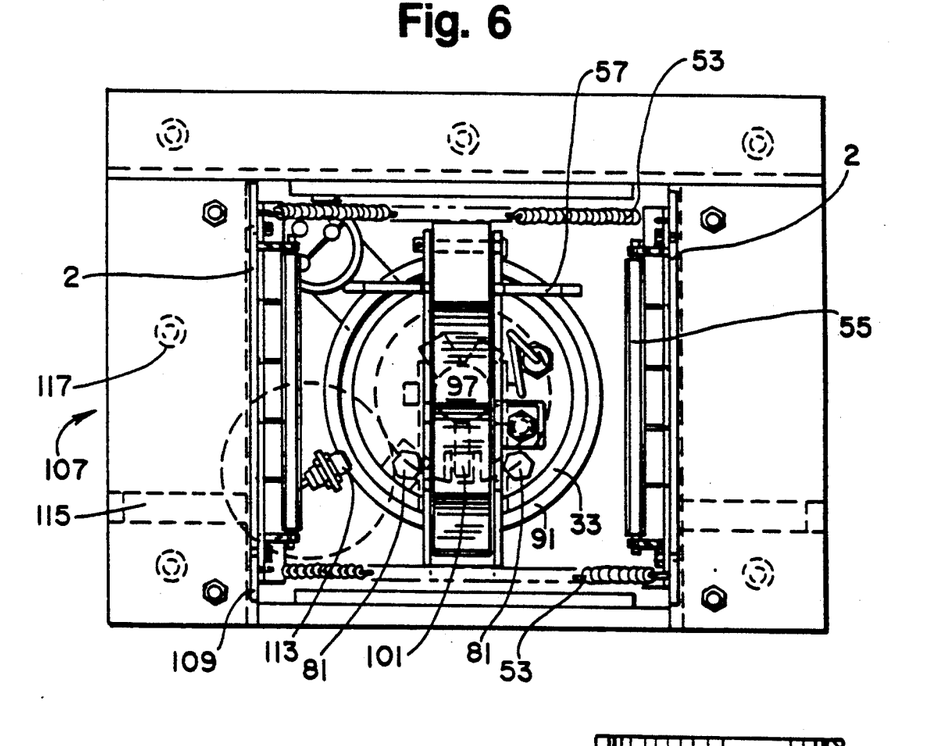
FIG. 6 is a top plan view of the vehicle restraint shown in FIG. 5.

The above discussion of FIG. 5 will be aided by a review of FIG. 6, showing a top view of the vehicle restraint.

Figure 7:
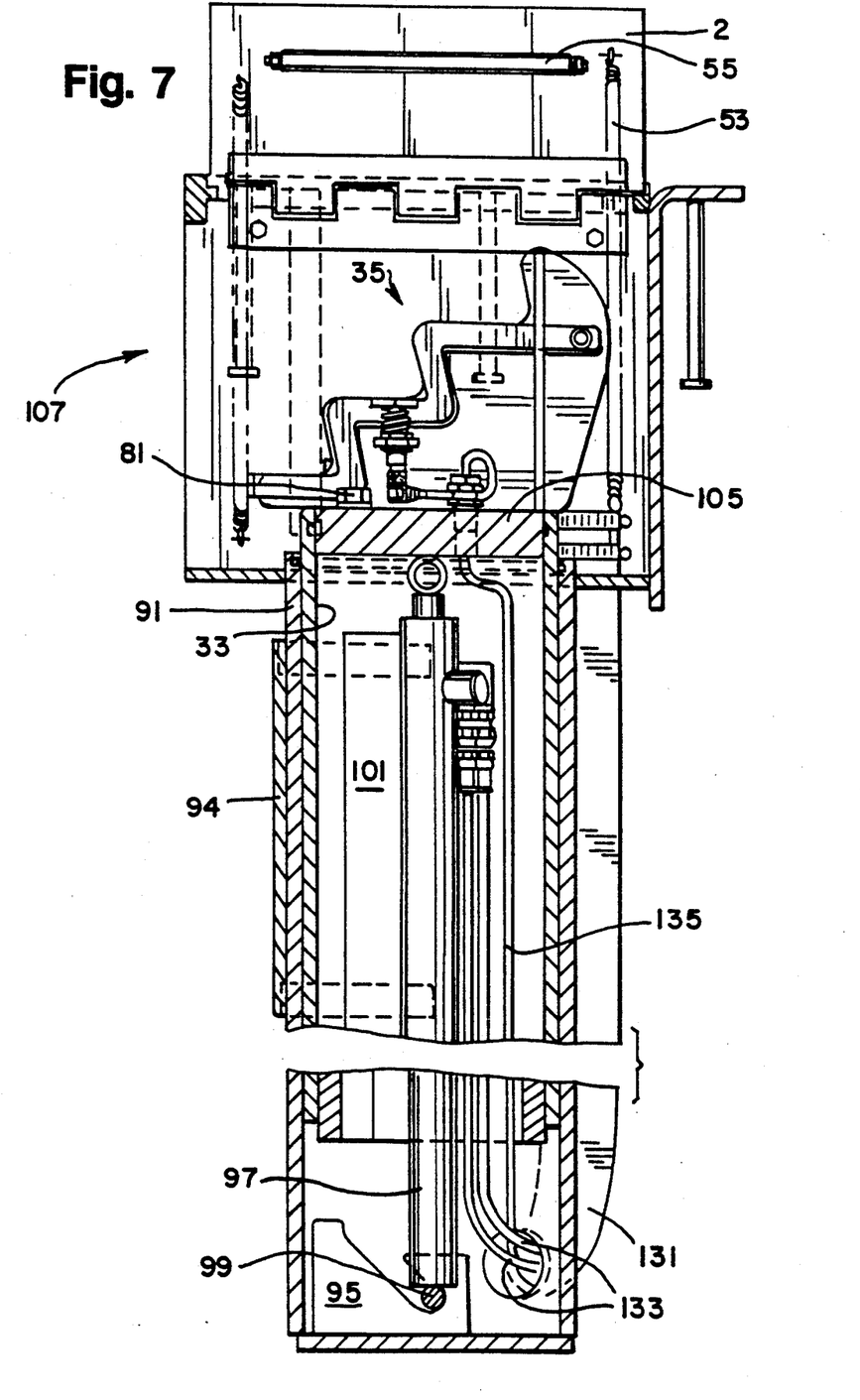
FIG. 7 is a sectional view of the device taken along line 7—7 of FIG. 5.

Turning now to FIG. 7, a side elevational view of the vehicle restraint is shown with the hook assembly 35 again in the stored position. A door 2 is shown in the raised position showing the roller 55 and the spring 53. The hook assembly 35 is attached by means of cap 105 and the bolts 81 to the lugs 153 of the intermediate tube 33. The intermediate tube 33 is slidably mounted within base tube 91. Reinforcing plate 94 is shown on the upper rear exterior of base tube 91. FIG. 7 illustrates conduit 131 through which hydraulic hoses 133 are inserted. Electrical cable 135 also is installed within conduit 131. Thus, it will be seen that conduit 131 allows for communication of the hydraulic hoses 133 and the electrical cable 135 from the vicinity of the hook box 107 to the bottom of the base tube 91 wherein the components then extend to the upper regions of the base tube 91 without interference from any moving parts.

FIG. 7 also illustrates the mounting of cylinder housing 97 by means of a cross pin 99 inserted into clevis 95. It will be understood that the hydraulic cylinder housing 97 can be removed easily for repair or replacement by exerting a sideways force against the cylinder housing thereby moving the bottom of the cylinder housing and the pin 99 in the appropriate direction for removal.

Figures 8, 9:
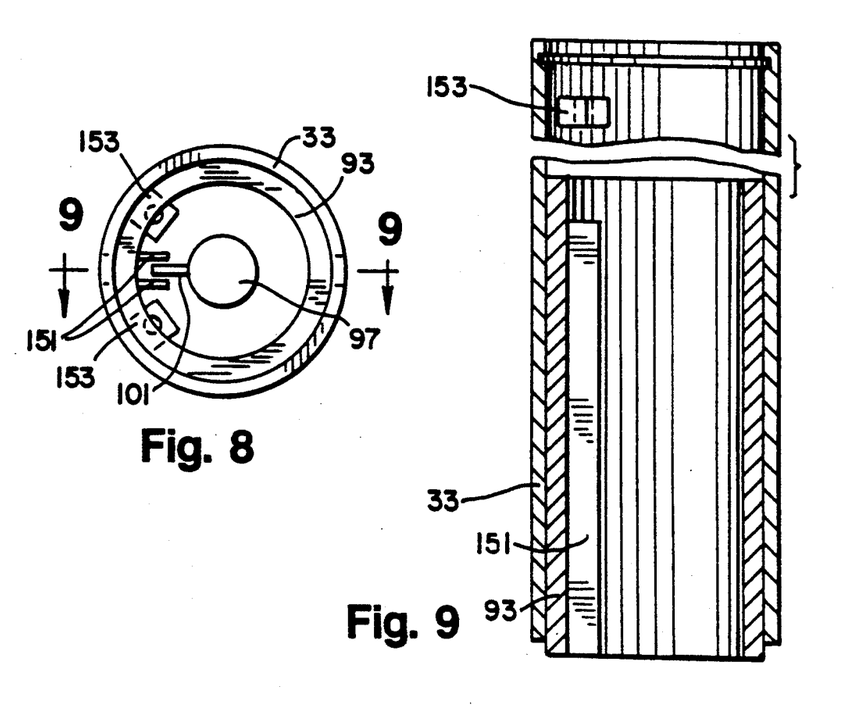
FIG. 8 is a fragmentary top plan view of the device of FIG. 5 and having portions removed to expose concealed components thereof.
FIG. 9 is a sectional view of the device taken along line 9—9 of FIG. 8.

Turning now to FIGS. 8 and 9, the intermediate tube 33 is shown with a stiffener tube 93 welded thereto to provide additional strength and reinforcement at the bottom of intermediate tube 33. As described previously, such reinforcement is useful when the intermediate tube 33 is extended a substantial distance above tube 91 (see FIG. 1b). The intermediate tube 33 and stiffener 93 are also provided with guide channels 151, allowing tube 33 to rotate about the cylinder housing 97 until stopped by rib 101. The intermediate tube 33 is also provided with lugs 153 to receive bolts 81 and to attach cap 105 to the top of the intermediate tube (see FIG. 5).

It will be seen from FIG. 8 that intermediate tube 33 is allowed to rotate within a predetermined range of angular motion or adaptation. Thus, the hook assembly 35 (mounted on the cap 105 of tube 33) is pivotable about a substantially vertically axis. The advantage of such rotation is to allow the hook assembly 35 to follow the angle at which the vehicle is parked with respect to the loading dock wall. Thus, the hook weldment 71 remains in maximum contact with the ICC bar. See FIG. 4. Returning to FIG. 8, the guide channels 151 prevent the tube 33 from rotating beyond the predetermined angle to avoid the possibility of the tube and thus the hook assembly 35 from rifling or rotating beyond the point at which the hook assembly 35 can effectively engage the ICC bar. For example, the vehicle restraint of the embodiment shown in FIG. 8 does not allow the hook assembly to rotate to a point at which it would be facing 180) away from the ICC bar where there would be imperfect or nonexistent restraint of the vehicle.

If, however, the vehicle is parked at a severely skewed angle with respect to the loading dock, thereby rotating the hook assembly 35 and the intermediate tube 33 to the point at which one of the guide channels 151, shown in FIG. 8, exerts a substantial force against rib 101, a safety mechanism for protection of the hydraulic cylinder is provided by means of the pin 99 and the drop-in clevis 95. See FIG. 5. If too much rotational force is thus exerted against the vehicle restraint, the pin 99 will automatically release from the drop-in clevis 95 thereby preventing damage to the cylinder housing 97. The intermediate tube 33 will remain constrained by the base tube 91, however, thus continuing to provide a restraint to the vehicle as long as the hook assembly 35 remains in contact and engagement with the ICC bar.

Figures 10, 11, 12:
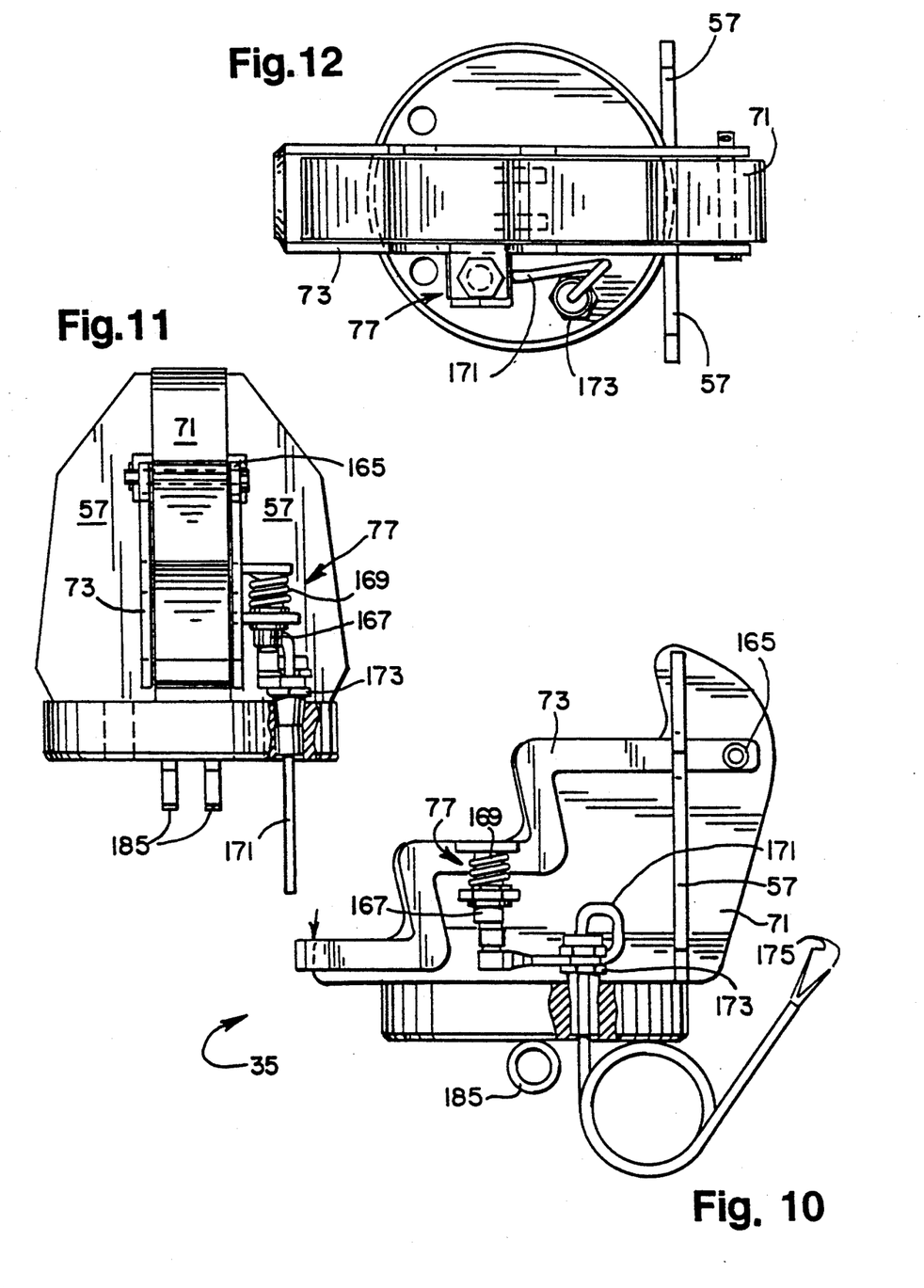
FIG. 10 is a side elevational view of the hook assembly of the device.
FIG. 11 is a front elevational view of the hook assembly of FIG. 10.
FIG. 12 is a top plan view of the hook assembly of FIG. 10.

Turning now to FIG. 10, a side elevational view of the hook assembly 35 illustrates the hook weldment 71 to which the sensor 73 is attached by inserting a pin through hole 165. Cam 57 also is shown. The switch assembly 77 is illustrated showing the switch 167 and the spring 169. A cable 135 communicates a signal from the switch 167 to the control station within the building. The cable 135 is mounted on cable mounting hardware 173. The cable 135 includes wires 175 for communicating a signal.

FIG. 11 is a front elevational view of the hook assembly 35 of FIG. 10 and more clearly illustrates the components of the assembly, including the cylinder rod connectors 185. Similarly, FIG. 12 is a top plan view of the hook assembly of FIG. 10.

In operation, the vehicle restraint 1 is activated by pushing the "up" button at the control station. The ram 33 is raised by power means until the sensor 73 engages the ICC bar 37, whereupon switch assembly 77 communicates engagement to the control station and the ram is stopped from further upward movement. If the ICC bar 37 thereafter "floats" upward, i.e., upon unloading the vehicle, sensor 73 and switch assembly 77 communicate the same to the control station, thereby reactivating the power means and raising the ram to the limit allowed by the overall dimensions of the vehicle restraint components. An alarm and reset may be provided for such a limit condition. If the ICC bar 37 "floats" downward, i.e., upon loading the vehicle, a hydraulic relief mechanism permits cylinder rod 103 (and thus the hook assembly 35) to retract by forcing hydraulic fluid out of the cylinder housing 97 by means of a relief valve into the hydraulic fluid tank. The vehicle restraint 1 may be returned to the stored position by pushing the "down" button at the control station, thereby lowering ram 33, hook assembly 35, etc., into the housing until switch 113 is contacted.

Thus, it will be seen that an improved vehicle restraint has been disclosed which is capable of below-ground storage and which is provided with an advantageous stepped hook and sensor for more effective restraint of a vehicle.

I claim:

1. A vehicle restraint comprising:
a housing substantially disposed below-ground, said housing having an opening in the top thereof;
a ram slidably mounted in said housing for reciprocating movement relative to the housing, said ram moving between a first stored position inside the housing and a second raised position;
first means for moving said ram in a substantially vertical direction through said opening between said first stored position inside the housing and said second raised position; and
second means attached to said ram for releasably retaining a vehicle when said ram is said second raised position, said second means being stored within said housing when said ram is in the first stored position.

2. The vehicle restraint of claim 1, further comprising third means for closing said opening when said ram is in said first position.

3. The vehicle restraint of claim 2, wherein said third means includes a door.

4. The vehicle restraint of claim 2, wherein said third means includes a pair of doors.

5. The vehicle restraint of claim 4, wherein said pair of doors, when closed, are flush with the ground.

6. The vehicle restraint of claim 1, wherein said second means includes a hook assembly having a step-like profile comprising a plurality of steps each step having a substantially vertical rise for releasably engaging a vehicle and sensor means for detecting said engagement.

7. The vehicle restraint of claim 1 wherein said second means includes a hook assembly, said hook assembly being pivotable about a substantially vertical axis to form a first angle with respect to the loading dock wall, said first angle being substantially the same as a second angle formed by the vehicle with respect to said loading dock wall.

8. The vehicle restraint of claim 1, wherein said housing includes a base tube for receiving said ram and wherein said ram includes an intermediate tube.

9. The vehicle restraint of claim 1, wherein said first means includes a hydraulic cylinder.

10. A hook assembly for use in a vehicle restraint, said hook assembly comprising:
a hook having a step-like profile comprised of a plurality of steps, each step having a substantially vertical rise for releasably engaging a vehicle; and
sensor means for detecting said engagement, said sensor means having a step-like profile comprising a plurality of steps.

11. A vehicle restraint comprising:
a base tube having an opening in the top thereof;
an intermediate tube having a cap in the form of a plate mounted thereon, said plate having a top face and a bottom face, the intermediate tube further being slidably mounted within said base tube;
a hydraulic cylinder being mounted within the base tube by connecting one end of the hydraulic cylinder to the bottom of the base tube
a cylinder rod mounted within said hydraulic cylinder, said cylinder rod being connected to the bottom face of the cap of the intermediate tube; and
hook means attached to the top face of said cap.

12. The vehicle restraint of claim 11, further comprising automatic release means for protecting said cylinder when the rotational force, about a vertical axis, on the hydraulic cylinder exceeds a certain limit.

13. The vehicle restraint of claim 11, wherein said hydraulic cylinder has a rib extending from the side thereof, and wherein said intermediate tube is provided with guide channels to limit rotational movement of said intermediate tube with respect to said rib.

14. The vehicle restraint of claim 11, wherein said hydraulic cylinder is connected to the bottom of said base tube using a pin and a clevis connection, said pin disengaging from said clevis when the rotational force, about a vertical axis, on the hydraulic cylinder exceeds a certain limit.

15. The vehicle restraint of claim 11, wherein the connection between the hydraulic cylinder and the bottom of the base tube is adapted to automatically diengage the hydraulic cylinder from the base tube when the rotational force, about a vertical axis, on the hydraulic cylinder exceeds a certain limit.

16. The vehicle restraint of claim 11, wherein a means is provided to limit rotational movement of the intermediate tube.

* * * * *